United States Patent
Kanzawa (10) Patent No.: US 11,216,987 B2
(45) Date of Patent: Jan. 4, 2022

(54) SYSTEMS AND METHODS FOR ASSOCIATING LIDAR POINTS WITH OBJECTS

(71) Applicant: Toyota Research Institute, Inc., Los Altos, CA (US)

(72) Inventor: Yusuke Kanzawa, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 187 days.

(21) Appl. No.: 16/443,102

(22) Filed: Jun. 17, 2019

(65) Prior Publication Data
US 2020/0394824 A1 Dec. 17, 2020

(51) Int. Cl.
| G06T 11/00 | (2006.01) |
| G06K 9/00 | (2006.01) |
| G01S 7/48 | (2006.01) |
| G01S 17/86 | (2020.01) |
| G01S 17/931 | (2020.01) |

(52) U.S. Cl.
CPC .......... *G06T 11/001* (2013.01); *G01S 7/4802* (2013.01); *G01S 17/86* (2020.01); *G01S 17/931* (2020.01); *G06K 9/00805* (2013.01); *G06T 2210/12* (2013.01)

(58) Field of Classification Search
CPC ... G06K 9/00805; G01S 17/931; G01S 17/86; G01S 7/4802; G01S 17/93; G06T 11/001; G06T 2207/30252; G06T 2207/30261; G06T 2210/12
See application file for complete search history.

(56) References Cited

U.S. PATENT DOCUMENTS

| 9,164,511 B1 | 10/2015 | Ferguson et al. |
| 9,625,582 B2 | 4/2017 | Gruver et al. |
| 10,063,849 B2 | 8/2018 | Pacala et al. |
| 2010/0204964 A1 | 8/2010 | Pack et al. |
| 2016/0055178 A1 | 2/2016 | Chiang |
| 2017/0169313 A1* | 6/2017 | Choi ................... G06K 9/4628 |
| 2018/0136332 A1 | 5/2018 | Barfield, Jr. et al. |
| 2018/0348346 A1* | 12/2018 | Vallespi-Gonzalez ....................... G01S 7/4802 |
| 2019/0287254 A1* | 9/2019 | Lakshmi Narayanan ................. G06T 5/002 |
| 2020/0074735 A1* | 3/2020 | Nowakowski .......... G06T 11/60 |
| 2020/0134833 A1* | 4/2020 | Biswas ................. G06K 9/342 |

* cited by examiner

*Primary Examiner* — Margaret G Mastrodonato
(74) *Attorney, Agent, or Firm* — Christopher G. Darrow; Darrow Mustafa PC (57) ABSTRACT

In one embodiment, a system for associating LiDAR points with objects is provided. Objects in an image are identified and bounding boxes are placed on each object in the image. LiDAR points are received and are projected into the image based on a reference frame of the image. All pixels of the image that are not inside a bounding box are changed to a color such as black. All points that are inside a bounding box are changed to a color that is unique to the particular bounding box. To determine which LiDAR points are associated with the objects in the image, for each LiDAR point a color of the pixel having the same coordinates in the image as the LiDAR point is determined. If the determined color is black than the LiDAR point is not associated with any object. Else, the LiDAR point is located in the bounding box that uses the determined color, and the LiDAR point can be labeled as being located with the object corresponding to the bounding box.

24 Claims, 6 Drawing Sheets

SYSTEMS AND METHODS FOR ASSOCIATING LIDAR POINTS WITH OBJECTS

TECHNICAL FIELD

The subject matter described herein relates, in general, to systems and methods for associating LiDAR points with objects, and, in particular, to associating LiDAR points with objects based on pixel colors.

BACKGROUND

LiDAR sensors are popular sensors for use in autonomous and semi-autonomous vehicles. A LiDAR sensor measures the distance to a target by illuminating the target with a pulse laser, and measuring the reflected pulses. Differences in return times and wavelengths for the pulses can then be used to generate a points that can be used to create a 3D representation of the target. Often, LiDAR sensors include a plurality of lasers, with each laser outputting a pulse laser at a different angle.

For autonomous and non-autonomous vehicles, it is desirable to combine the points generated by LiDAR sensors with the objects detected in images by computer vision algorithms. However, because LiDAR sensors may generate millions of points, determining which LiDAR points correspond to detected objects can be time consuming.

For example, a computer vison algorithm may detect objects in an image taken by a camera associated with a vehicle. The computer vision algorithm may highlight these detected objects using rectangles called bounding boxes. After projecting the LiDAR points into the image based on coordinates associated with the LiDAR points and a reference frame of the image, to determine which points are associated with each bounding box, the system must, for each bounding box, calculate whether the coordinates of each point falls within the bounding box. If there are two million points and ten bounding boxes the system must make twenty million calculations. Given that these LiDAR points and detected objects are used for a variety of vehicle functions that are time sensitive, it is desirable to reduce the number of calculations that are made.

SUMMARY

In one embodiment, a system for associating LiDAR points with objects is provided. Objects in an image are identified and bounding boxes are placed on each object in the image. LiDAR points are received and are projected into the image based on a reference frame of the image. All pixels of the image that are not inside a bounding box are changed to a color such as black. All points that are inside a bounding box are changed to a color that is unique to the particular bounding box. To determine which LiDAR points are associated with the objects in the image, for each LiDAR point a color of the pixel having the same coordinates in the image as the LiDAR point is determined. If the determined color is black than the LiDAR point is not associated with any object. Else, the LiDAR point is located in the bounding box that uses the determined color, and the LiDAR point can be labeled as being located with the object corresponding to the bounding box.

As will be described further below, the system described herein solves many problems described above with respect to combining LiDAR points with objects detected by computer vision functions. Because each LiDAR point is examined once to determine its color, the number of computations is greatly reduced. Continuing the example above, if there are two million LiDAR points and ten bounding boxes, the system described herein only requires two million calculations to associate LiDAR points with bounding boxes, which is an improvement on the twenty million calculations required by the prior art. Unlike the prior art, the system described herein scales linearly with the number of LiDAR points and is not effected by the number of bounding boxes.

In an embodiment, a system for associating LiDAR points with objects is provided. The system includes: one or more processors; and a memory communicably coupled to the one or more processors. The memory stores: a detection module including instructions that when executed by the one or more processors cause the one or more processors to: receive a first image from a camera associated with a vehicle; detect a plurality of objects in the first image; and generate a bounding box around each object of the plurality of objects in the first image. The memory further stores: a labeling module including instructions that when executed by the one or more processors cause the one or more processors to: project each bounding box into a second image, wherein the second image comprises a plurality of pixels and each pixel has coordinates in a reference frame; set pixels of the plurality of pixels whose coordinates are outside of any bounding box of the plurality of bounding boxes to a first color of a plurality of colors; associate each bounding box of the plurality of bounding boxes with a different color of the plurality of colors other than the first color; for each bounding box, set pixels of the plurality of pixels whose coordinates are inside of the bounding box to the color associated with the bounding box; receive a plurality of points from a LiDAR sensor, wherein each point is associated with coordinates in the reference frame; for each point of the plurality of points: determine the color associated with the pixel having the same coordinates as the point; and if the determined color is not the first color, label the point as being associated with the object of the plurality of objects that corresponds to the bounding box that is associated with the determined color; and provide the some or all of the labeled plurality of points and the first image for use by one or more vehicle functions.

In an embodiment, a method for associating LiDAR points with objects is provided. The method includes: receiving a first image from a camera associated with a vehicle, wherein the first image has a reference frame; detecting an object in the first image; generating a bounding box around the object in the first image; projecting the bounding box into a second image, wherein the second image comprises a plurality of pixels and each pixel has coordinates in the reference frame; setting pixels of the plurality of pixels whose coordinates are outside the bounding box to a first color; setting pixels of the plurality of pixels whose coordinates are inside the bounding box to a second color; receiving a plurality of points from a LiDAR sensor, wherein each point is associated with coordinates in the reference frame; for each point of the plurality of points: determining if the color of a pixel having the same coordinates as the point is the second color; if the determined color is the second color, labeling the point as being associated with the object; and if the determined color is the first color, labeling the point as not being associated with the object; and using the some or all of the labeled plurality of points and the first image for one or more vehicle functions.

In an embodiment, a method for associating LiDAR points with objects is provided. The method includes: receiving a first image from a camera associated with a vehicle, wherein the first image has a reference frame; detecting a plurality of objects in the first image; generating a bounding box around each object of the plurality of objects in the first image; projecting each bounding box into a second image, wherein the second image comprises a plurality of pixels and each pixel has coordinates in the reference frame; setting pixels of the plurality of pixels whose coordinates are outside of any bounding box of the plurality of bounding boxes to a first color of a plurality of colors; associating each bounding box of the plurality of bounding boxes with a different color of the plurality of colors other than the first color; for each bounding box, setting pixels of the plurality of pixels whose coordinates are inside of the bounding box to the color associated with the bounding box; receiving a plurality of points from a LiDAR sensor associated with the vehicle, wherein each point is associated with coordinates in the reference frame; for each point of the plurality of points: determining the color associated with the pixel having the same coordinates as the point; and if the determined color is not the first color, labeling the point as being associated with the object of the plurality of objects that corresponds to the bounding box that is associated with the determined color; and using the some or all of the labeled plurality of points and the first image for one or more vehicle functions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
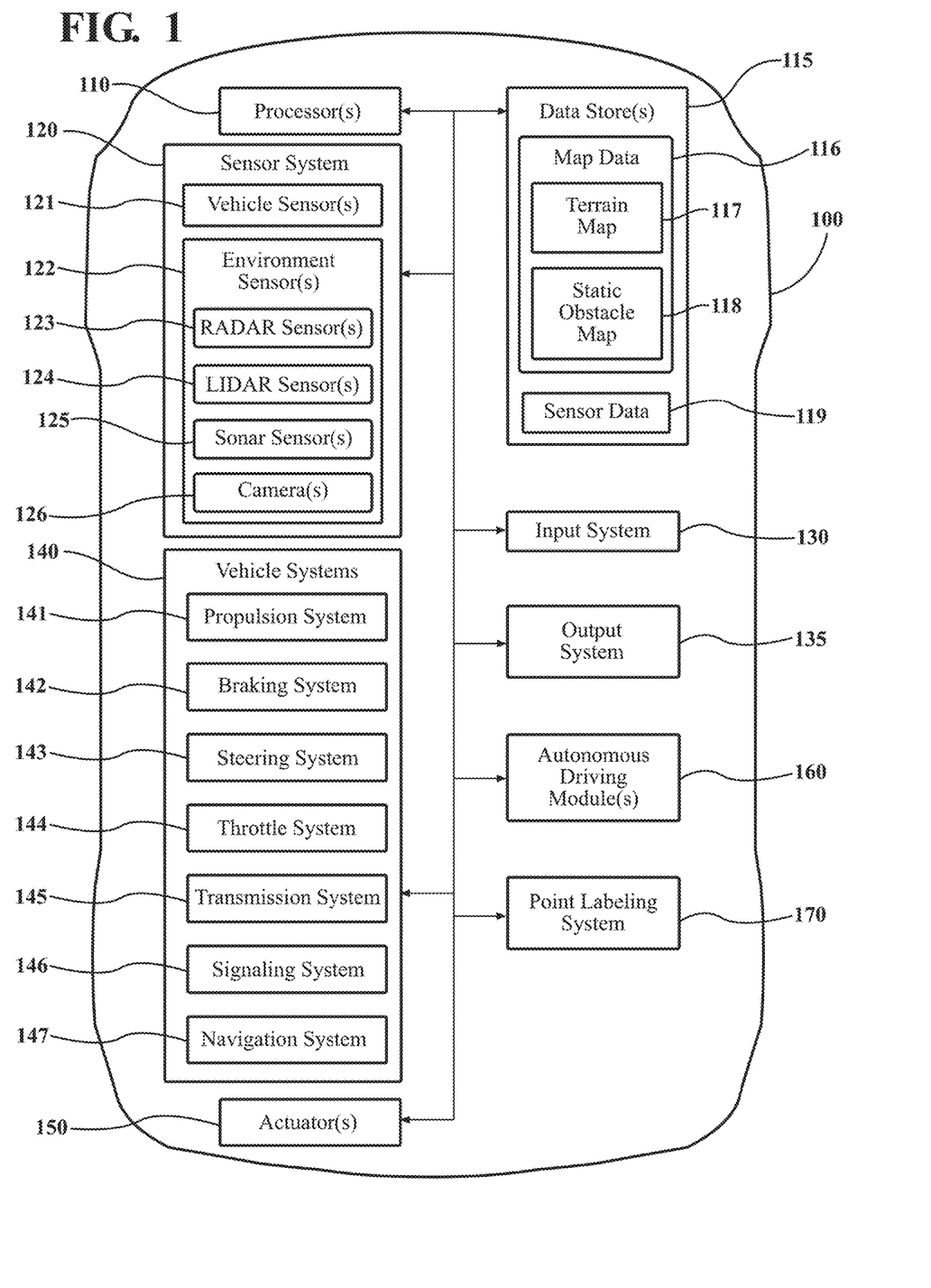
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the point labeling system 170 that is implemented to label the points provided by a LiDAR sensor. The noted functions and methods will become more apparent with a further discussion of the figures.

Figure 2:
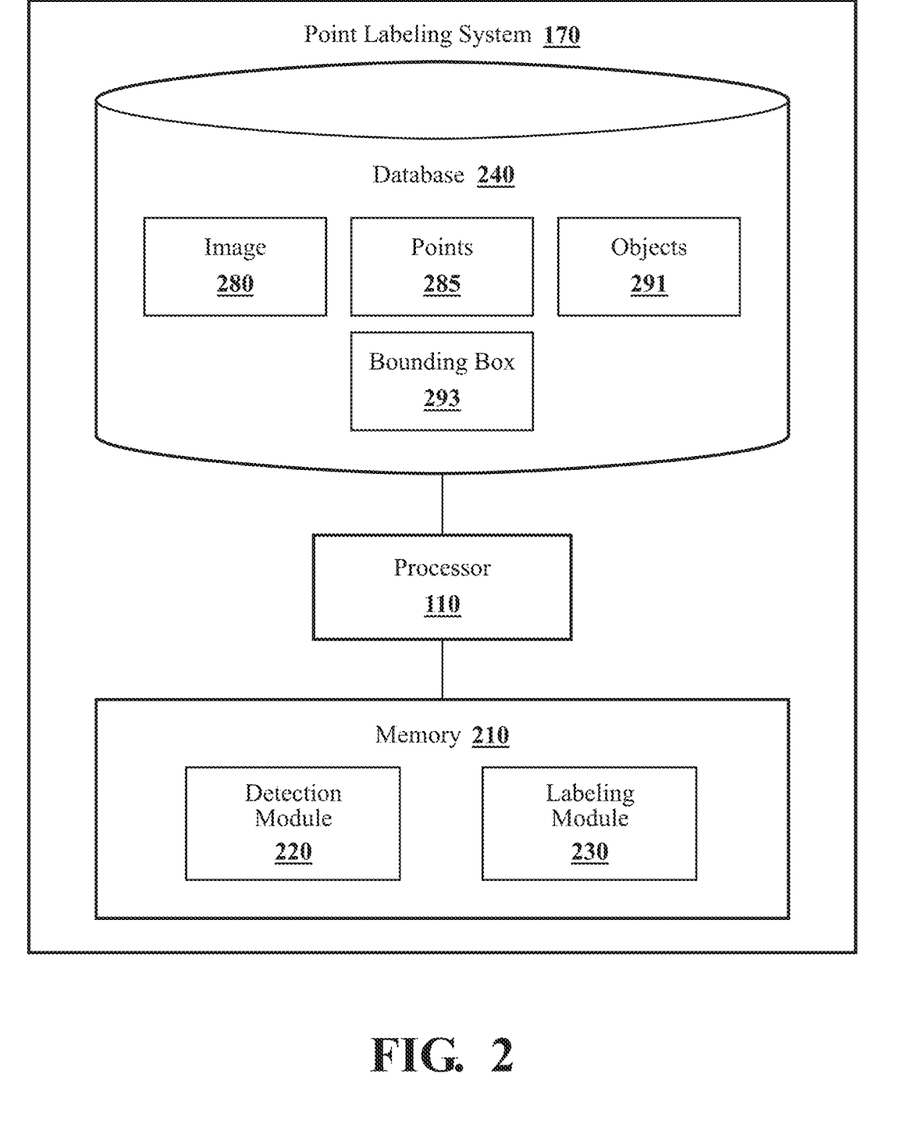
FIG. 2 illustrates one embodiment of a point reduction system.

With reference to FIG. 2, one embodiment of the point labeling system 170 of FIG. 1 is further illustrated. The point labeling system 170 is shown as including a processor 110 from the vehicle 100 of FIG. 1. Accordingly, the processor 110 may be a part of the point labeling system 170, the point labeling system 170 may include a separate processor from the processor 110 of the vehicle 100, or the point labeling system 170 may access the processor 110 through a data bus or another communication path. It should be appreciated, that while the point labeling system 170 is illustrated as being a single contained system, in various embodiments, the point labeling system 170 is a distributed system that is comprised of components that can be provided as a centralized server, a cloud-based service, and so on.

In one embodiment, the point labeling system 170 includes a memory 210 that stores a detection module 220 and a labeling module 230. The memory 210 is a random-access memory (RAM), read-only memory (ROM), a hard-disk drive, a flash memory, or other suitable memory for storing the module 220 and the module 230. The modules 220 and 230 are, for example, computer-readable instructions that when executed by the processor 110 cause the processor 110 to perform the various functions disclosed herein. Moreover, as previously noted, in various embodiments, one or more aspects of the point labeling system 170 are implemented as cloud-based services, and so on. Thus, one or more modules of the point labeling system 170 may be located remotely from other components and may be implemented in a distributed manner.

Furthermore, in one embodiment, the point labeling system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes an image 280 along with, for example, other information that is used and/or generated by the modules 220 and 230 such as points 285, objects 291, and bounding boxes 293. Of course, in further embodiments, the various information may be stored within the memory 210 or another suitable location.

The detection module 220 is configured to receive an image 280 and detect one or more objects 291 in the image 280. The image 280 may be received from a sensor associated with the vehicle 100 such as a camera 126. The image 280 may include a plurality of pixels and a resolution. Each pixel may be associated with coordinates (e.g., an x-coordinate and a y-coordinate) in a reference frame used by the image 280.

The detection module 220 may detect the one or more objects 291 in the image 280 using one or more computer vision algorithms trained to identify objects 291 in images 280. Depending on the embodiment, the objects 291 may include a variety of objects 291 such as other vehicles, pedestrians, signs, animals, etc. Any type of computer vision algorithm may be used.

The detection module 220 may be configured to generate a bounding box 293 for each of the one or more objects 291 detected in the image 280. Each bounding box 293 may surround or contain the associated object 291 in the image 280. In some embodiments the bounding boxes 293 may be rectangles. Other shapes may be used. Any method for generating and placing bounding boxes 293 in an image 280 may be used. Each bounding box 293 may have a set of coordinates in the reference frame of the image 280.

Figure 3:
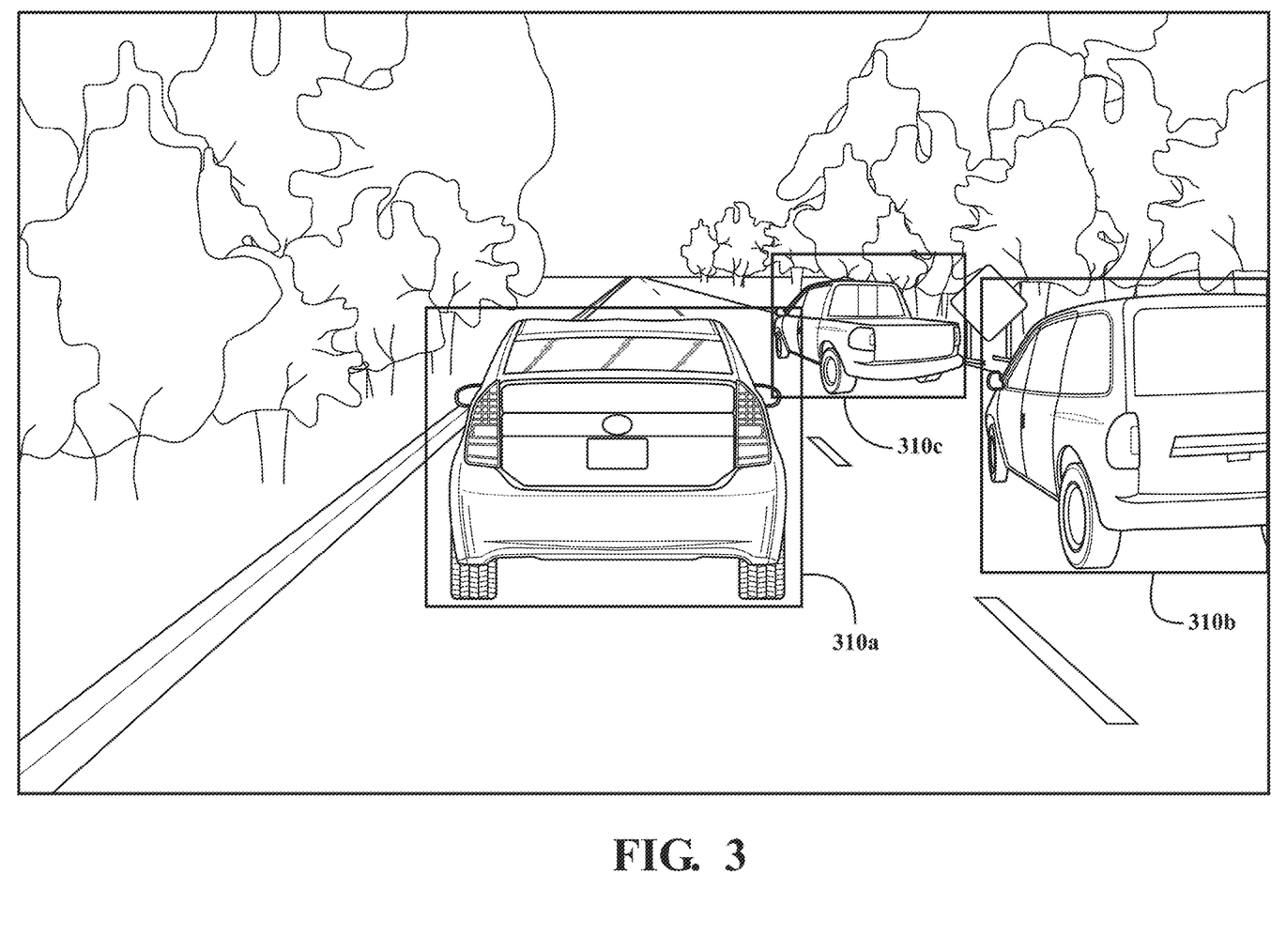
FIGS. 3-4 illustrate example images.

For example, FIG. 3 is an illustration of an example image taken by a camera 126 of a vehicle 100. As shown, the detection module 220 has detected three objects 291 in the image 300, image, and has overlaid bounding boxes (i.e., the bounding boxes 310a, 310b, and 310c) onto each detected object 291.

Returning to FIG. 2, the labeling module 230 may be configured to generate a new image 280 based on the original received image 280. The new image 280 may be the same resolution (i.e., number of pixels) as the original received image 280 and may use the same reference frame as the original received image 280. Depending on the embodiment, the labeling module 230 may generate the new image 280 from the original by setting each pixel of the original image 280 to a selected color. For example, the labeling module 230 may set each pixel to the color black. Other colors may be used so long as the color used for each pixel is the same. The color may be specified by a user or administrator.

The labeling module 230 may be further configured to project or place each bounding box 293 into the new image 280. Because the new image 280 and the original image 280 use the same reference frame and have the same resolution, the labeling module 230 may project each bounding box 293 using the coordinates associated with the bounding box 293 in the original image 280. Any method for placing bounding boxes 293 in images 280 may be used.

The labeling module 230 may be configured to set, for each bounding box 293 placed in the new image 280, the color of each pixel contained in the bounding box 293 to a selected color. The selected color used for the pixels of each bounding box 293 may be different for each bounding box 293 and may be different from the color originally used to set each pixel of the image 280. The particular colors used for each bounding box 293 may be set by a user or administrator.

For example, consider an image 280 with two bounding boxes 293. The labeling module 230 may set all of the pixels located inside of the first bounding box 293 to red and may set all of the pixels located inside of the second bounding box 293 to blue. All of the pixels located outside of the first or second bounding box 293 may remain set to black.

When two or more bounding boxes 293 overlap in the image 280, the labeling module 230 may have to determine which color to use for pixels that are in the overlapping region. In some embodiments, the labeling module 230 may determine which bounding box is associated with an object 291 that is closer to the vehicle 100 or camera 126, and may set the color of the pixels based on the color associated with the bounding box 293 that is associated with the closer object 291. Any method for determining the closer object 291 may be used.

In some implementations, rather than determine the closest object 291, when bounding boxes 293 overlap, the labeling module 230 may determine the bounding box 293 with the lowest coordinates (i.e., lowest y-coordinates) in the image 280, and may set the color of the pixels based on the color associated with the bounding box 293 having the lowest coordinates in the image 280. As may be appreciated, because of the location of the camera 126 on the vehicle 100, generally closer objects 291 appear lower in the image 280 than distant objects 291. Depending on the embodiment, the labeling module 230 may determine the bounding box 293 by determining the bounding box 293 with the lowest associated y-coordinate in the image 280. Other methods may be used.

Figure 4:
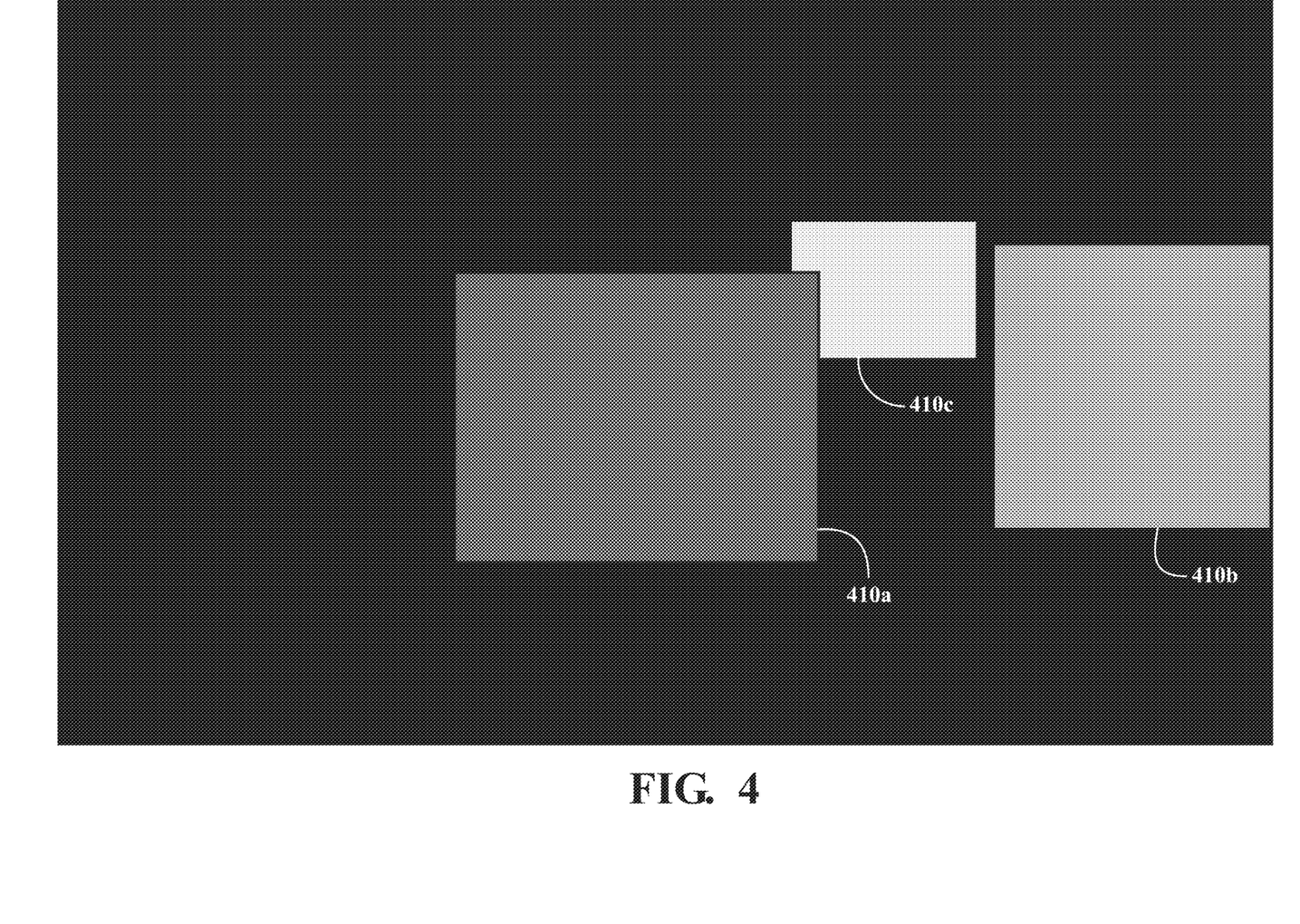

For example, FIG. 4 is an illustration of a new image generated based on the image of FIG. 3. The new image has the same resolution and reference frame as the original image. As can be seen, each pixel of the image illustrated in FIG. 3 has been replaced by a black pixel in the image illustrated in FIG. 4.

Also shown in the image illustrated in FIG. 4 are the bounding boxes (i.e., the bounding boxes 410a, 410b, and 410c). As can be seen, the pixels in each bounding box have been set to a color that is associated with their respective bounding box. The pixels in the bounding box 410a have been set to a dark grey. The pixels in the bounding box 410b have been set to a lighter grey. The pixels in the bounding box 410c have been set to an even lighter grey. Note that a region of the bounding box 410a overlaps a region of the bounding box 410c. Because the bounding box 410a is lower in the image (i.e., has lower y-coordinates) the pixels of the overlapping regions are set to the color of the bounding box 410a.

Returning to FIG. 2, the labeling module 230 may be configured to receive points 285 from a LiDAR sensor 124 and to project the points 285 into the new image 280. The labeling module 230 may project the points 285 using coordinates associated with each point 285 and the reference frame of the image 280. Depending on the embodiment, each point 285 may share coordinates with at least one pixel in the image 280.

The labeling module 230 may be configured to label some or all of the points 285 to indicate which object 291 that they are associated with. A point 285 may be labeled as associated with an object 291 when the point 285 has coordinates that are located inside of the bounding box 293 associated with the object 291. In some embodiments, to label a point 285, the labeling module 230 may determine the color of the pixel having the same coordinates of the point 285 in the second image 280. As described above, a black pixel indicates that the associated point 285 is not inside any of the bounding boxes 293. Accordingly, if the pixel is black, the labeling module 230 may label the point 285 as not being associated with any object 291, may leave the point 285 unlabeled, or may delete or remove the point 285.

If the color of the pixel having the same coordinates of the point 285 in the second image 280 is any color other than black, then the point 285 is located inside of a bounding box 293. The labeling module 230 may then determine the bounding box 293 that is associated with the color of the pixel, and may label the point 285 as being associated with the object 291 that corresponds to the determined bounding box 293.

After labeling some or all of the points 285, the labeling module 230 may provide the labeled points 285 and for use by one or more vehicle functions. The vehicle functions may include object detection, vehicle navigation, and collision avoidance, for example. In some embodiments, the labeling module 230 may provide the labeled points 285 along with the original image 280 and bounding boxes 293 that identify the detected objects 291 to the one or more vehicle functions. The vehicle functions may be performed by the autonomous driving modules 160 of the vehicle 100, for example.

Figure 5:
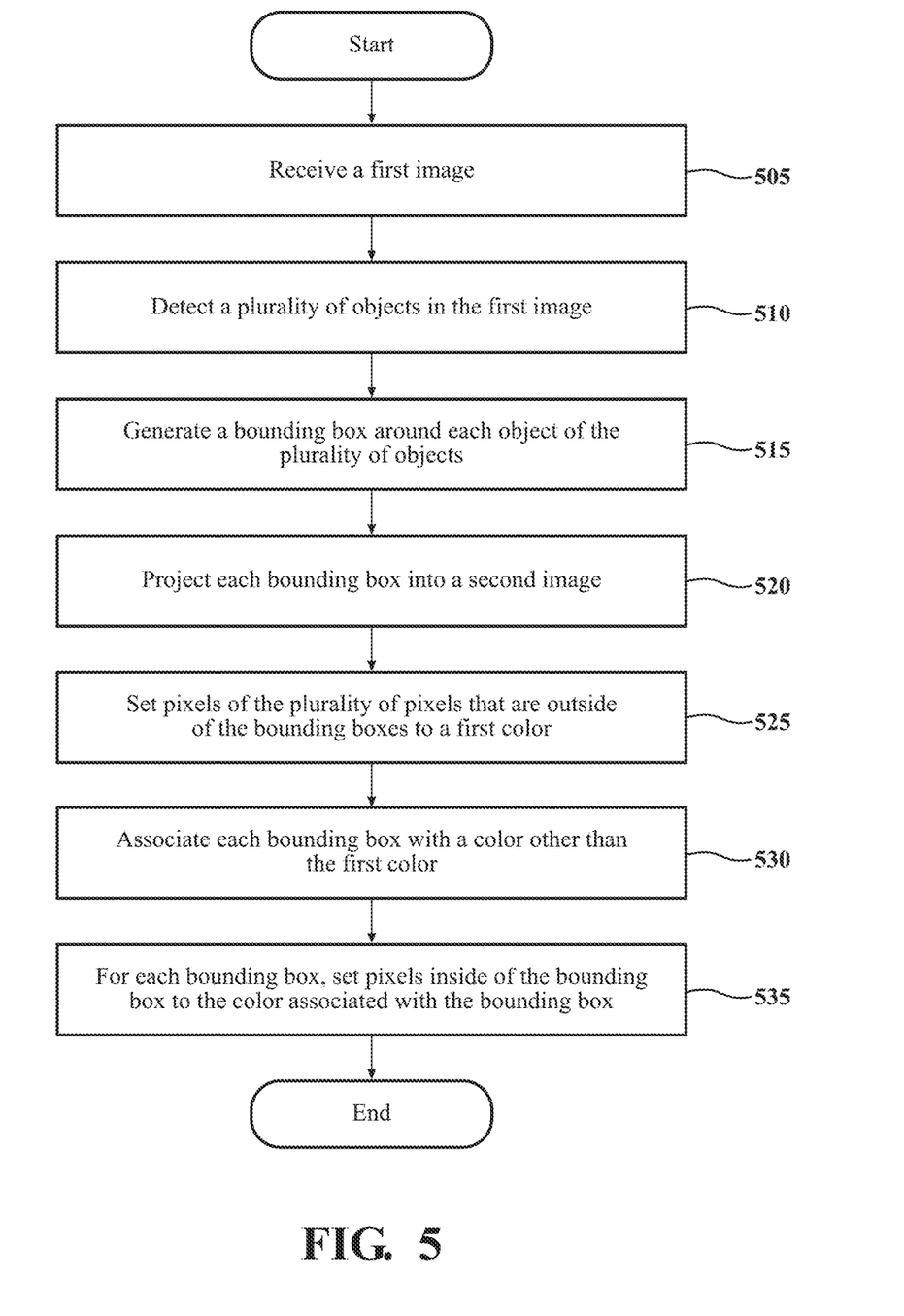
FIG. 5 illustrates a flowchart of a method that is associated with projecting bounding boxes in images.

Additional aspects of point 285 labeling will be discussed in relation to FIG. 5. FIG. 5 illustrates a flowchart of a method 500 that is associated with projecting points 285 into an image 280 including bounding boxes 293. The method 500 will be discussed from the perspective of the point labeling system 170 of FIGS. 1 and 2. While the method 500 is discussed in combination with the point labeling system 170, it should be appreciated that the method 500 is not limited to being implemented within the point labeling system 170 but is instead one example of a system that may implement the method 500.

At 505, the detection module 220 receives a first image 280. The first image may 280 may be received from a camera 126 associated with a vehicle 100. The first image 280 may be of an environment in front of, or around, the vehicle 100. The image 280 may have a resolution and may be associated with a reference frame and coordinate system.

At 510, the detection module 220 detects a plurality of objects 291 in the first image 280. The detection module 220 may detect the objects 291 using one or more computer vision algorithms. Other methods may be used.

At 515, the detection module 220 generates a bounding box 293 around each object 291 of the plurality of detected objects 291. Each bounding box 293 may be substantially rectangular and may be associated with coordinates in the coordinate system associated with the first image 280. Any method for generating bounding boxes 293 may be used.

At 520, the labeling module 230 projects each bounding box 293 into a second image 280. The second image 280 may have the same resolution and coordinate system as the first image 280. The bounding boxes 293 may have the same coordinates in the second image 280 as in the first image 280.

At 525, the labeling module 230 sets pixels of the second image 280 that are outside of the bounding boxes 293 to a first color. In one embodiment, the first color is black. Other colors may be used, so long as each of the pixels is set to the same color.

At 530, the labeling module 230 associates each bounding box 293 with a color of a plurality of colors. The color associated with a bounding box 293 may be any color other than the first color (i.e., the color used for pixels outside of the bounding boxes 293). Each bounding box 293 may be associated with a different color. The colors used for each bounding box 293 may be set by a user or administrator.

At 535, the labeling module 230, for each bounding box 293, sets pixels inside of the bounding box 293 to the color associated with the bounding box 293. For example, if the color associated with a bounding box 293 is green, the labeling module 230 may set each pixel to the color green. Any method for setting the colors of pixels may be used.

Figure 6:
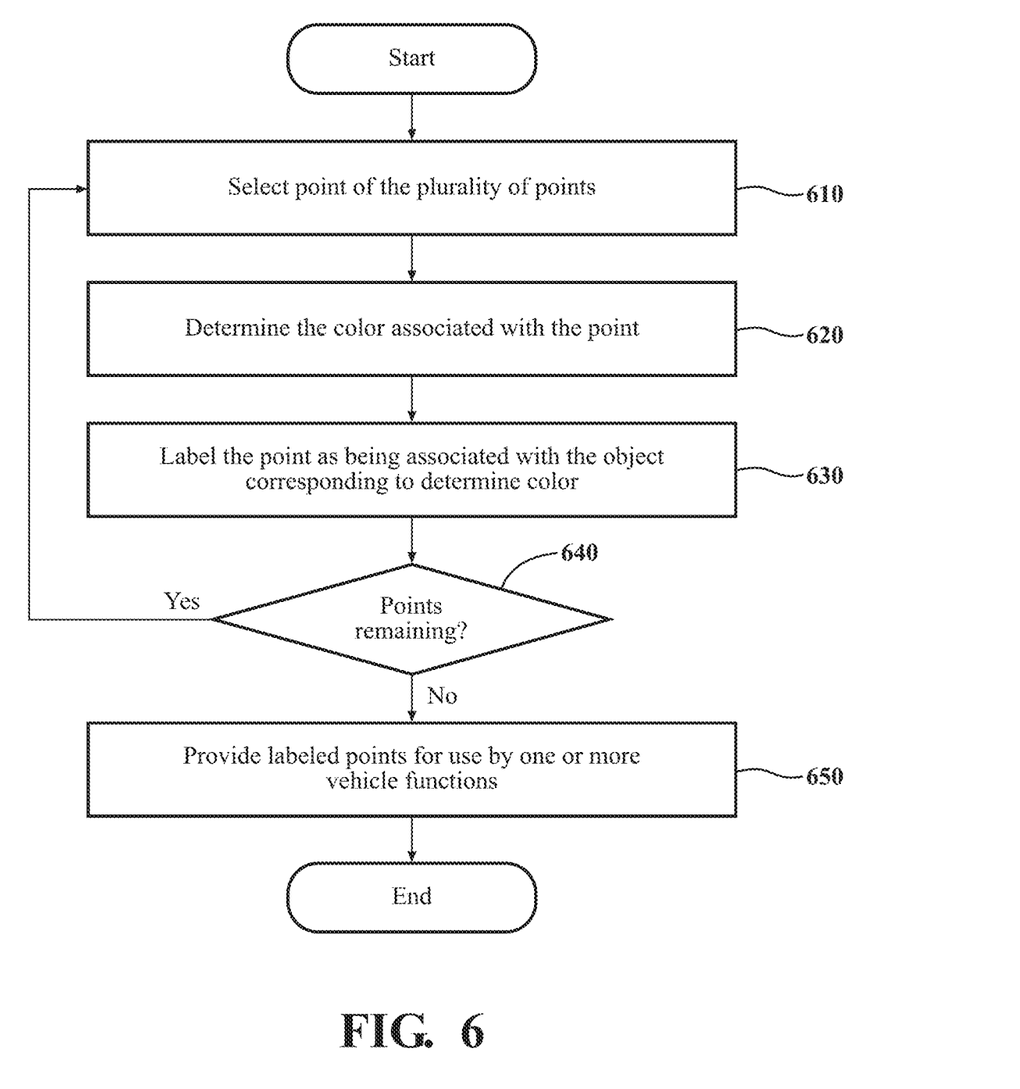
FIG. 6 illustrates a flowchart of a method that is associated with labeling points.

Additional aspects of point 285 labeling will be discussed in relation to FIG. 6. FIG. 6 illustrates a flowchart of a method 600 that is associated with labeling points 285. The method 600 will be discussed from the perspective of the point labeling system 170 of FIGS. 1 and 2. While the method 600 is discussed in combination with the point labeling system 170, it should be appreciated that the method 600 is not limited to being implemented within the point labeling system 170 but is instead one example of a system that may implement the method 600.

At 610, the labeling module 230 selects a point 285 of a plurality of points 285. The points 285 may be received from a LiDAR sensor 124 associated with a vehicle 100. The vehicle 100 may be the same vehicle 100 described in FIG. 5. The labeling module 230 may randomly select the point 285, or the point 285 may be selected according to some orders such as ordering the points 285 based on the associated coordinates, for example.

At 620, the labeling module 230 determines the color associated with the point 285. The color may be the color of the pixel in the second image 280 that has the same coordinates as the selected point 285. Any method for determining the color may be used.

At 630, the labeling module 230 labels the point 285 as being associated with the object 291 corresponding to the determined color. If the point 285 is associated with a color other than the first color (e.g., black), the point 285 is associated with an object 291. The object 291 may be correspond to the bounding box 293 that is associated with the determined color. Depending on the embodiment, if the color is the first color, the labeling module 230 may discard the point 285 or may label the point 285 as not being associated with any object 291.

At 640, the labeling module 230 determines if there are any points 285 that have not yet been labeled. If there are remaining points 285, the method 600 may return to 610 where a new point 285 may be selected by the labeling module 230. Else, the method 600 may continue to 650.

At 650, the labeling module 230 provides the labeled points 285 for use by one or more vehicle functions. The vehicle functions may include object detection, hazard avoidance, and navigation, for example. Other functions may be supported. Depending on the embodiment, the labeling module 230 may provide the labeled points 285 along with the first image 280 and bounding boxes 293.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LiDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the point labeling system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the point labeling system 170, and/or the autonomous driving module(s) 160 may control some or all of these vehicle systems 140 and, thus, may be partially or fully autonomous.

The processor(s) 110, the point labeling system 170, and/or the autonomous driving module(s) 160 can be operatively connected to communicate with the various vehicle systems 140 and/or individual components thereof. For example, returning to FIG. 1, the processor(s) 110, the point labeling system 170, and/or the autonomous driving module(s) 160 can be in communication to send and/or receive information from the various vehicle systems 140 to control the movement, speed, maneuvering, heading, direction, etc. of the vehicle 100. The processor(s) 110, the point labeling system 170, and/or the autonomous driving module(s) 160 may control some or all of these vehicle systems 140.

The processor(s) 110, the point labeling system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the point labeling system 170, and/or the autonomous driving module(s) 160 can control the direction and/or speed of the vehicle 100. The processor(s) 110, the point labeling system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the point labeling system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for associating LiDAR points with objects, comprising:
   one or more processors; and
   a memory communicably coupled to the one or more processors and storing:
      a detection module including instructions that when executed by the one or more processors cause the one or more processors to:
         receive a first image from a camera associated with a vehicle;
         detect a plurality of objects in the first image; and
         generate a bounding box of a plurality of bounding boxes around each object of the plurality of objects in the first image, wherein a region of a first bounding box, of the plurality of bounding boxes, overlaps a second bounding box of the plurality of bounding boxes; and
      a labeling module including instructions that when executed by the one or more processors cause the one or more processors to:
         project each bounding box into a second image, wherein the second image comprises a plurality of pixels and each pixel has coordinates in a reference frame;
         set pixels of the plurality of pixels whose coordinates are outside of any bounding box of the plurality of bounding boxes to a first color of a plurality of colors;
         associate each bounding box of the plurality of bounding boxes with a different color of the plurality of colors other than the first color;
         set the pixels:
            inside the first bounding box, but outside the region to a second color as the different color,
            inside the second bounding box, but outside the region to a third color as the different color, and
            inside the region to one of the second color and the third color based on an answer to a question about the first bounding box and the second bounding box;
         receive a plurality of points from a LiDAR sensor, wherein each point is associated with the coordinates in the reference frame;
         for each point of the plurality of points:
            determine the color associated with the pixel having the same coordinates as the point; and
            if the determined color is not the first color, label the point as being associated with the object of the plurality of objects that corresponds to the bounding box that is associated with the determined color; and
         provide some or all of a labeled plurality of points and the first image for use by one or more vehicle functions.

2. The system of claim 1, wherein the plurality of objects are detected using a computer-vision function.

3. The system of claim 1, wherein the vehicle is an autonomous vehicle.

4. The system of claim 1, wherein the first color is black.

5. The system of claim 1, wherein the first image and the second image have a same resolution.

6. The system of claim 1, wherein the labeling module further includes instructions that when executed by the one or more processors cause the one or more processors to:
   for each point of the plurality of points:
      if the determined color is the first color, label the point as not being associated with any object of the plurality of objects.

7. The system of claim 1, wherein the one or more vehicle functions include navigation and collision avoidance.

8. A method for associating LiDAR points with objects, comprising:
   receiving a first image from a camera associated with a vehicle, wherein the first image has a reference frame;
   detecting a first object and a second object in the first image;
   generating a first bounding box around the first object in the first image;
   generating a second bounding box around the second object in the first image, wherein a region of the second bounding box overlaps the first bounding box;
   projecting the first bounding box and the second bounding box into a second image, wherein the second image comprises a plurality of pixels and each pixel has coordinates in the reference frame;
   setting pixels of the plurality of pixels whose coordinates are outside the first bounding box and the second bounding box to a first color;
   setting the pixels:
      inside the first bounding box, but outside the region to a second color, inside the second bounding box, but outside the region to a third color, and
inside the region to one of the second color and the third color based on an answer to a question about the first bounding box and the second bounding box;
receiving a plurality of points from a LiDAR sensor, wherein each point is associated with the coordinates in the reference frame;
for each point of the plurality of points:
determining if the color of a pixel, having the same coordinates as the point, is at least one of the second color or the third color;
if the color is of the second color or the third color, labeling the point as being associated with the object; and
if the color is the first color, labeling the point as not being associated with the object; and
using some or all of a labeled plurality of points and the first image for one or more vehicle functions.

9. The method of claim 8, wherein the object is detected using a computer-vision function.

10. The method of claim 8, wherein the vehicle is an autonomous vehicle.

11. The method of claim 8, wherein the first color and the second color are different.

12. The method of claim 8, wherein the first color is black.

13. The method of claim 8, wherein the first image and the second image have a same resolution.

14. A method for associating LiDAR points with objects, comprising:
receiving a first image from a camera associated with a vehicle, wherein the first image has a reference frame;
detecting a plurality of objects in the first image;
generating a bounding box of a plurality of bounding boxes around each object of the plurality of objects in the first image, wherein a region of a first bounding box, of the plurality of bounding boxes, overlaps a second bounding box of the plurality of bounding boxes;
projecting each bounding box into a second image, wherein the second image comprises a plurality of pixels and each pixel has coordinates in the reference frame;
setting pixels of the plurality of pixels whose coordinates are outside of any bounding box of the plurality of bounding boxes to a first color of a plurality of colors;
associating each bounding box of the plurality of bounding boxes with a different color of the plurality of colors other than the first color;
setting the pixels:
inside the first bounding box, but outside the region to a second color as the different color,
inside the second bounding box, but outside the region to a third color as the different color, and
inside the region to one of the second color and the third color based on an answer to a question about the first bounding box and the second bounding box;
receiving a plurality of points from a LiDAR sensor associated with the vehicle, wherein each point is associated with the coordinates in the reference frame;
for each point of the plurality of points:
determining the color associated with the pixel having the same coordinates as the point; and
if the determined color is not the first color, labeling the point as being associated with the object of the plurality of objects that corresponds to the bounding box that is associated with the determined color; and
using some or all of a labeled plurality of points and the first image for one or more vehicle functions.

15. The method of claim 14, wherein the plurality of objects are detected using a computer-vision function.

16. The method of claim 14, wherein the vehicle is an autonomous vehicle.

17. The method of claim 14, wherein the first color is black.

18. The method of claim 14, wherein the first image and the second image have a same resolution.

19. The method of claim 14, further comprising:
for each point of the plurality of points:
if the determined color is the first color, labeling the point as not being associated with any object of the plurality of objects.

20. The method of claim 14, wherein the one or more vehicle functions include navigation and collision avoidance.

21. A system, comprising:
a processor; and
a memory storing a module including instructions that cause the processor to:
produce, from a first image, a second image having:
a first bounding box that corresponds to a first object in the first image, and
a second bounding box that corresponds to a second object in the first image, wherein a region of the second bounding box overlaps the first bounding box;
set, in the second image, pixels:
inside the first bounding box, but outside the region to a first color,
inside the second bounding box, but outside the region to a second color, and
inside the region to one of the first color and the second color based on an answer to a question about the first bounding box and the second bounding box;
label, in response to a pixel in the second image, that corresponds to a point received from a LiDAR, not being at least one of the first color or the second color, the point as being unassociated with at least one of the first object or the second object; and
provide, to a vehicle function, the first image and the point as labeled.

22. The system of claim 21, wherein the instructions that cause the processor to label the point comprise instructions to label, in response to the pixel being the at least one of the first color or the second color, the point as being associated with the at least the first object or the second object.

23. The system of claim 21, wherein:
the question is which bounding box, between the first bounding box and the second bounding box, is associated with an object, between the first object and the second object, that is nearest to a camera that produced the first image, and
the instructions to set, in the second image, the pixels inside the region comprise:
instructions to set, in the second image and in response to the answer being the first bounding box, the pixels inside the region to the first color, and
instructions to set, in the second image and in response to the answer being the second bounding box, the pixels inside the region to the second color.

24. The system of claim 21, wherein:
the question is which bounding box, between the first bounding box and the second bounding box, has a lower lowest height boundary between a lowest height boundary of the first boundary box and a lowest height boundary of the second boundary box, and the instructions to set, in the second image, the pixels inside the region comprise:

instructions to set, in the second image and in response to the answer being the first bounding box, the pixels inside the region to the first color, and instructions to set, in the second image and in response to the answer being the second bounding box, the pixels inside the region to the second color.

\* \* \* \* \*